May 14, 1963 S. G. BRADY ET AL 3,089,296
WORK HOLDING FIXTURE FOR GRINDING HALF ROUND GROOVES
Filed May 25, 1959 3 Sheets-Sheet 1
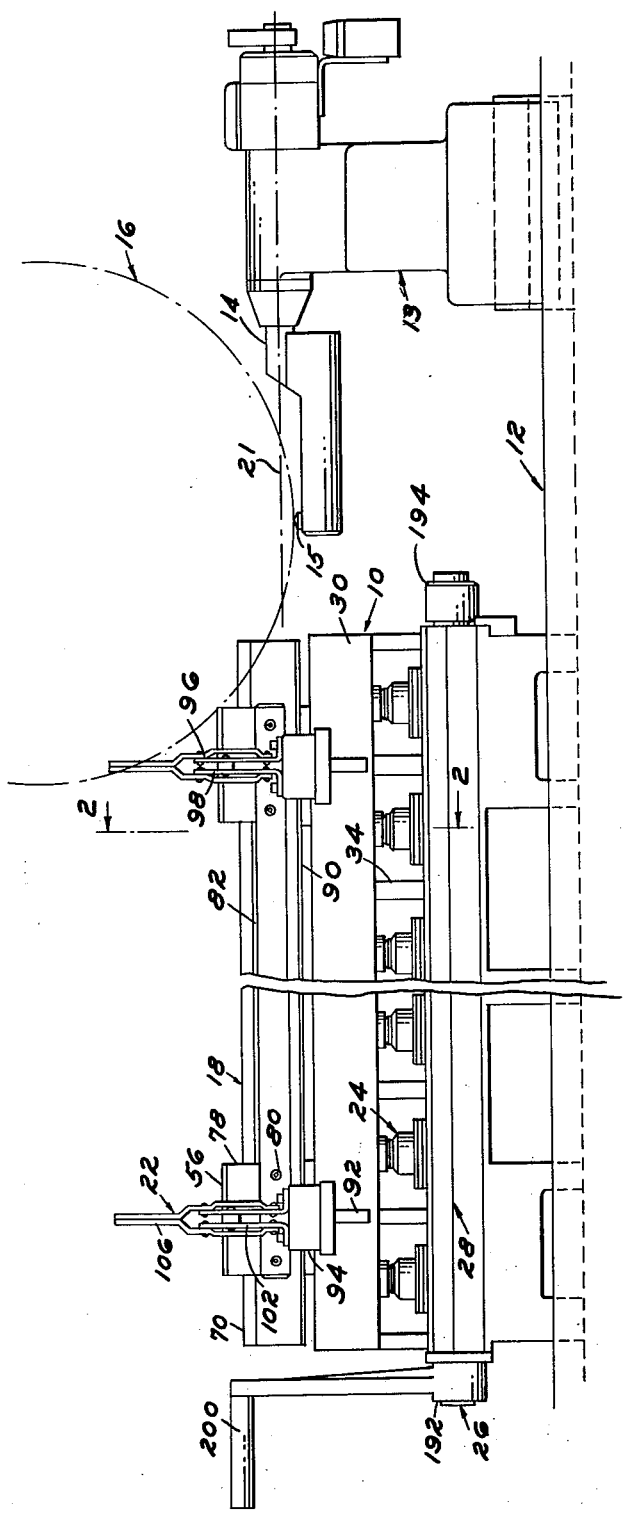
INVENTORS
SAMUEL G. BRADY
WILHELM DRALLE
BY Whittemore
Hulbut & Belknap
ATTORNEYS

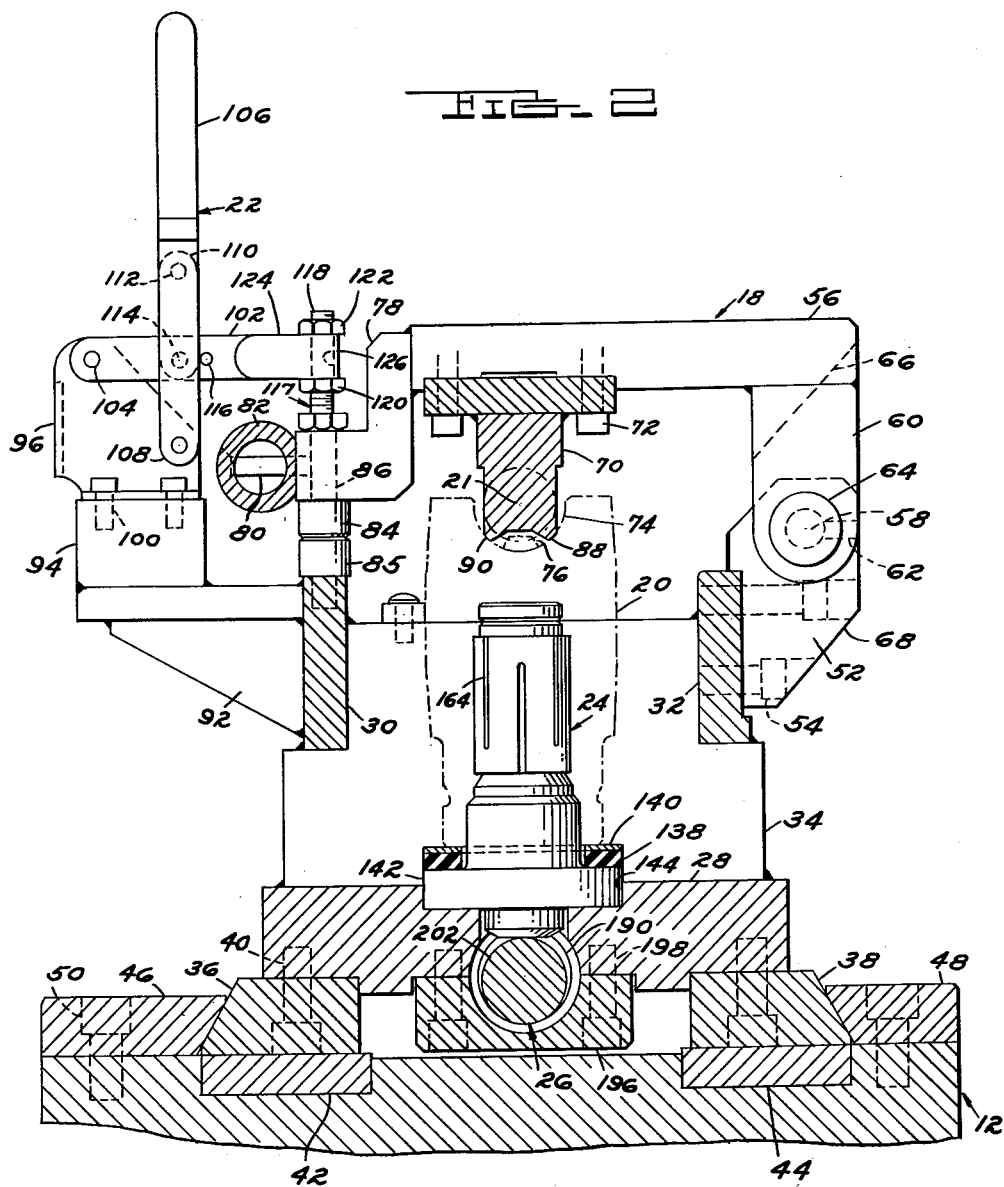

May 14, 1963    S. G. BRADY ET AL    3,089,296
WORK HOLDING FIXTURE FOR GRINDING HALF ROUND GROOVES
Filed May 25, 1959    3 Sheets-Sheet 3
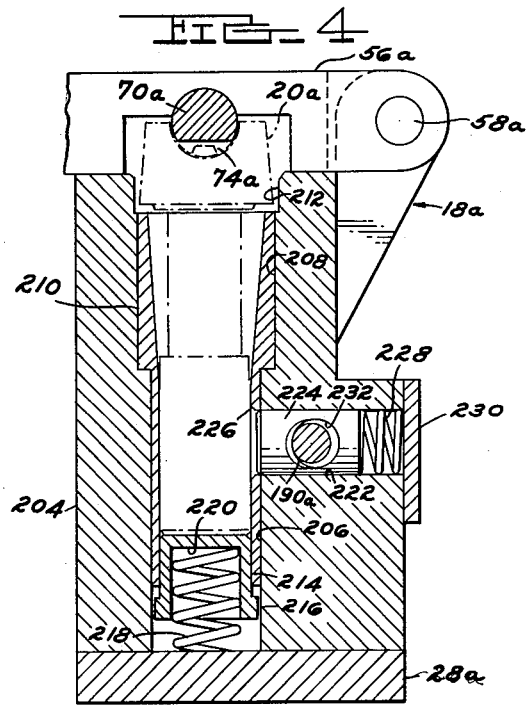
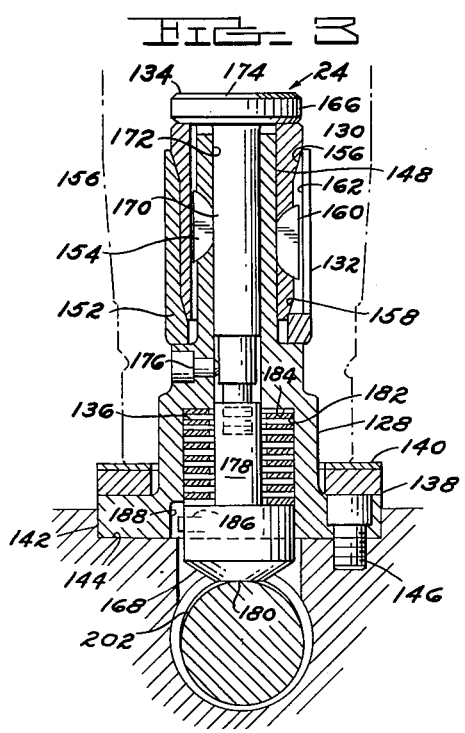
INVENTORS
SAMUEL G. BRADY
WILHELM DRALLE
BY Whittemore
Hulbert & Belknap
ATTORNEYS

United States Patent Office 3,089,296
Patented May 14, 1963

3,089,296
WORK HOLDING FIXTURE FOR GRINDING HALF ROUND GROOVES
Samuel G. Brady, Birmingham, and Wilhelm Dralle, Detroit, Mich., assignors, by mesne assignments, to Ex-Cell-O Corporation, Detroit, Mich., a corporation of Michigan
Filed May 25, 1959, Ser. No. 815,363
16 Claims. (Cl. 51—227)

The present invention relates to a work holding fixture and refers more particularly to apparatus for holding work from which it is desired to remove a predetermined amount of material while producing half round grooves or the like therein, including a locating bar to locate the work relative to a tool for removing said material, locking clamps and stops to assure the correct positioning of the locating bar with respect to said tool, means to firmly grasp the work after it has been correctly located and while it is worked, and an eccentric shaft for releasing the work after the material has been removed therefrom.

In the past the positioning of a plurality of work pieces in machines such as grinding machines for the purposes of producing similar surfaces thereon and removing a similar amount of material therefrom in so doing has generally been accomplished on an individual basis, each piece being positioned separately. Often such positioning has been accomplished by a system of successive gaging and repositioning. Such procedures are wasteful of the time of the machines in which the work is being positioned and of the skilled personnel required to make such adjustment. Furthermore the individual manual positioning of work pieces is apt to produce errors in the positioning of the work pieces.

It is therefore one of the essential objects of the present invention to provide apparatus for the automatic positioning of work pieces.

It is another object to provide a work holding fixture for positioning similar work pieces without the necessity of individual adjustment thereof and for holding them in said position while they are being worked.

Another object is to provide a work holding fixture including means to initially position a plurality of work pieces without individual adjustment thereof, and means to releasably hold said work in said position during the working thereof.

More specifically it is an object of the present invention to provide a work holding fixture including a locating bar and locking clamps adapted to position work without the necessity of individual adjustment thereof, an expanding mandrel to firmly hold the work in the position determined by the locating bar and locking clamps and an eccentric shaft operable to cause said expanding mandrel to release said work.

Still more specifically it is an object of the present invention to provide a work holding fixture for positioning work in which it is desired to grind half round grooves including a locating bar, a locking clamp, an expanding mandrel, and an eccentric shaft, wherein the work to be ground is placed over the unexpanded mandrel and positioned with respect to a grinding wheel by means of the locating bar and the locking clamps, the mandrel is then caused to expand by means of the eccentric shaft to firmly grip the work while the work is being ground, and on completion of the grinding the mandrel is caused to release the work by means of the eccentric shaft.

A further object of the present invention is to provide a work holding fixture for positioning and holding work wherein the work is inserted in a sleeve, positioned by a locating bar and a locking clamp acting in opposition to resilient means and is releasably held in position by an eccentric cam operated shoe member frictionally engaging said work piece.

Other objects and features of the invention will become apparent as the description proceeds, especially when taken in conjunction with the accompanying drawings illustrating preferred embodiments of the invention, wherein:

FIGURE 1 is an elevation of the work holding fixture of the invention.

FIGURE 2 is a cross-section of the work holding fixture of FIGURE 1 taken on the line 2—2 in FIGURE 1.

FIGURE 3 is a cross-section of a work holding means of the work holding fixture of FIGURE 1 which is especially adapted to holding work having recessed ends.

FIGURE 4 is a section of a modified work holding means of the work holding fixture of FIGURE 1 which is especially adapted to holding work pieces having solid ends.

A particular embodiment of the work holding fixture of the invention will now be described with reference to the figures.

As shown in FIGURE 1 the work holding fixture of the invention includes a frame generally indicated 10 which is adjustably mounted on the table 12 of a grinding machine in a predetermined relation to a dresser mechanism generally indicated 13 which includes a spindle 14 having attached thereto a diamond dresser point 15 which functions to dress a grinding wheel 16, a locating apparatus generally indicated 18 for locating work pieces 20 placed in the work holding fixture with relation to the axis of rotation 21 of the dresser spindle 14, locking clamps generally indicated 22 for assuring the correct positioning of the locating apparatus 18, expanding mandrels generally indicated 24 operable to securely hold a work piece placed in the work holding fixture, and cam release means generally indicated 26 for releasing work pieces 20 from expanding mandrels 24. The frame 10, locating apparatus 18, locking clamps 22, expanding mandrels 24 and cam release 26 cooperate in operation to position work pieces 20 with respect to the axis of rotation 21 of the dresser spindle 14 of the grinding machine 12 so that grinding wheel 16 formed by the diamond dresser point 15 of dressing apparatus 13 will remove an equal amount of metal from each work piece 20 as the wheel 16 passes over the work pieces 20 in operation of the grinding machine due either to movement of the grinding wheel 16 along table 12 or to movement of table 12 with respect to the grinding wheel.

The frame 10 comprises a horizontal longitudinal member 28, a pair of vertical longitudinal members 30 and 32 and a plurality of vertical members 34 perpendicular to the members 28, 30 and 32 and spaced apart longitudinally thereof as best shown in FIGURES 1 and 2. A pair of longitudinally extending wear strips 36 and 38 are secured to the outer edges of the bottom surface of member 28 by means of bolts 40 as shown in FIGURE 2. The wear strips 36 and 38 are positioned on wear members 42 and 44 which are set in the table of the grinding machine 12 as shown. The wear strips 36 and 38 and the attached horizontal frame member 28 are adjustably secured in position on wear members 42 and 44 by means of guide strips 46 and 48 which are secured to the table of the grinding machine 12 by means of bolts 50 as shown in FIGURE 2. The frame members 28, 30, 32 and 34 may be secured together by convenient means such as welding as shown in FIGURE 2 and they support the locating apparatus 18, the locking clamps 22, expanding mandrels 24 and cam release 26.

The locating apparatus 18 as best shown in FIGURE 2 is secured to frame 10 by means of bracket hinges 52 spaced along frame member 32 and secured thereto by bolts 54. Hinge arms 56 shaped as shown in FIGURE 2 are connected to bracket hinges 52 by means of hinge pin 58. The downwardly extending portions 60 of hinge arms 56 are each in the form of a pair of arms which contact opposite sides of bracket hinges 52. Hinge pins 58 are secured to bracket hinges 52 by means of set screws 62. Hinge arms 56 are freely rotatable with respect to pins 58 which are journaled in bushings 64 provided in the downwardly extending arms of the portions 60 thereof as shown in FIGURE 2.

Neoprene bumpers 66 extend between the arms of the portions 60 of the hinge arms 56 in the position shown in FIGURE 2. The neoprene bumpers 66 are provided to cushion the contact between the hinge arms 56 and the bracket hinges 52 when the hinge arms 56 are in the open position. With the hinge arms 56 in their open position the neoprene bumpers 66 positioned as shown on hinge arms 56 will contact surfaces 68 of bracket hinges 52 preventing violent contact between the hinge arms 56 and the bracket hinges 52.

A locating bar 70 as shown in FIGURE 2 is secured to the underside of the hinge arms 56 by means of bolts 72. The locating bar 70 as shown in FIGURE 1 extends for the entire length of the work holding fixture of the invention and is shaped as shown to enable positioning of work pieces such as 20 in which it is desired to grind half round grooves 74 having projections 76 within the grooves 74. It will of course be understood that other shapes for the locating bar 70 are possible to position work pieces 20 in which it is desired to grind either the same or differently shaped grooves.

The free end of the hinge arms 56 is formed by members 78 shaped as shown in FIGURE 2 and welded to the horizontal sections of the hinge arms 56. The members 78 have attached thereto by means of bolts 80 a cylindrical bar 82 which extends longitudinally of the work holding fixture of the invention as shown in FIGURE 1. The cylindrical bar 82 is provided to facilitate the pivoting of hinge arms 56 about pins 58 into the open position wherein neoprene bumpers 66 contact surfaces 68 of bracket hinges 52.

Rest buttons 84 are secured to the members 78 in the position shown in FIGURE 2 by means of threaded shanks 86 thereon. The rest buttons 84 align with similar rest buttons 85 threadedly secured to the frame member 30 as shown in FIGURE 2. The rest buttons 84 and 85 are provided to limit the counter-clockwise pivotal movement of the hinge arm 56 so that the axis of the locating bar 70 which is the center for arcuate surfaces 88 and 90 is aligned with the axis of rotation 21 of the dresser spindle when the buttons 84 and 85 are in contact. When the locating bar 70 is thus aligned with the axis of rotation 21 of the dresser spindle 14 the surfaces 88 and 90 of the locating bar 70 have a predetermined relation with respect to the diamond dresser point 15 such that the work contacting surface of grinding wheel 16 is dressed by dresser point 15 to be of slightly larger diameter than the distance from the axis 21 to the similarly located surfaces 88 and 90. Work pieces 20 held against surfaces 88 and 90 of locator bar 70 while being positioned will therefore have an equal amount of metal removed therefrom on passage of the grinding wheel 16 thereacross. The exact amount of metal removed from work pieces 20 will depend on the relative radial location of the dresser point 15 and surfaces 88 and 90 with respect to axis 21.

Locking clamps 22 are spaced longitudinally of the work holding fixture as shown in FIGURE 1. The locking clamps 22 are supported by T-shaped brackets 92 which are attached to frame members 30. Pedestal blocks 94 as shown are welded to brackets 92 to provide a base of proper height for locking clamps 22. The locking clamps 22 each comprise a pair of L-shaped brackets 96 and 98 secured to the pedestal blocks 94 by means of bolts 100, a lever arm 102 pivotally mounted at 104 between brackets 96 and 98, a fork shaped handle member 106 pivotally mounted at 108 to the bracket members 96 and 98, and connecting links 110 pivotally connected to the handle member 106 at 112 and pivotally connected to the lever arm 102 at 114. Pins 116 extend perpendicularly to lever arms 102 in the position shown in FIGURE 2 to provide positive stops for handle members 106 during movement thereof in a clockwise direction. Adjustable stop members generally indicated 117 in the form of a bolt 118 in conjunction with a pair of nuts 120 and 122 is secured to the free end of lever arms 102 by means of bracket members 124 which have passages 126 therethrough and which may be attached to lever arms 102 by convenient means such as welding. The stops 117 are provided on the end of lever arms 102 to insure proper contact between the rest buttons 84 and 85 when the locking clamps 22 are in the locking position as shown in FIGURE 2. On counter-clockwise pivoting of handles 106 of locking clamps 22 about pivot points 108 the lever arms 102 are caused to move upward pivoting about points 104 due to their connection to handles 106 through connecting links 110. Thus it is possible to pivot the locating apparatus 18 about pins 58 when the locking clamps 22 are in their non-locking position wherein lever arms 102 are pivoted about points 104 raising the stops 117 on the free end thereof.

Expanding mandrels 24 are provided to receive the work pieces 20 which it is desired to position so that grooves 74 may be ground therein. The mandrels 24 are spaced longitudinally along the work holding fixture on the horizontal frame members 28 as shown in FIGURES 1 and 2. Each expanding mandrel 24 comprises a generally cylindrical body member 128, a cone 130, an expandable sleeve 132, a plunger 134, spring 136, circular rubber spring 128 and steel washer 140.

The body member 128 is provided with a flange 142 on the lower end thereof which is set in a recess 144 in the horizontal frame member 28 and is secured therein by means of bolts 146. The body member 128 has an upper portion 148 which has a reduced external diameter as shown in FIGURE 3. The body member 128 as shown is also provided with a passage 172 therethrough which has an enlarged diameter portion 82 at the lower end thereof.

A cone 130 having cam surfaces 150 and 152 on the exterior thereof is sleeved over the portion 148 of body member 128 for axial movement with respect thereto. Key 154 is provided acting between the portion 148 of member 128 and cone 130 to prevent rotation of cone 130 with respect to the upper portion 148 of the member 128.

Sleeve 132 is positioned as shown best in FIGURE 3 and surrounds cone 130. The inner surface of sleeve 132 is provided with cam surfaces 156 and 158 which register with cam surfaces 150 and 152 on cone 130. A key 160 is attached to cone 130 and is operable in connection with a groove 162 in sleeve 132 to prevent sleeve 132 from rotating with respect to cone 130. Sleeve 132 is further provided with angularly spaced longitudinal slots 164. Alternate slots 164 extend from opposite ends of sleeve 132 to within a short distance of the other end of sleeve 132 as shown best in FIGURE 2. Slots 164 are provided so that as cone 130 as shown in FIGURE 3 is moved downward the sleeve 132 is allowed to expand radially under pressure on cam surfaces 156 and 158 applied thereto through cam surfaces 150 and 152 on cone 130.

The plunger 134 as shown best in FIGURE 3 extends axially of the body member 128 of the expanding mandrel 24. The plunger 134 includes an upper portion 166 and a lower portion 168. The upper portion 166 comprises a shaft 170 positioned within passage 172 in body member 128 and an enlarged cap 174 attached to shaft 170 and in assembly contacting the upper end of cone 130. A set screw 176 extends through the body member 128 into the passage 172 to contact the shaft 170. The set screw 176 functions to allow shaft 170 to slide vertically within passage 172 and to prevent rotation of shaft 170 within the passage 172. The lower portion 168 of plunger 134 includes a shank 178 and an enlarged head 180. As illustrated in FIGURE 3 the portion 168 of plunger 134 is positioned within the enlarged diameter portion 182 at the lower end of passage 172 in body member 128 with the shank 178 threadedly engaging the lower end of shaft 170. A spring 136 is provided within the enlarged diameter portion 182 as shown in FIGURE 3 acting between the surface 184 of passage 172 and the enlarged head 180 of the lower portion 168 of plunger 134 to bias the plunger 134 in a downward direction. A locating pin 186 extends radially from the enlarged head 180 of portion 168 of plunger 134 into a notch 188 in the bottom of body member 128 of the expanding mandrel 24 to allow vertical movement of the plunger 134 and to prevent rotation of portion 168 of plunger 134.

An annular rubber ring is sleeved over each expanding mandrel 24 and rests on the flange 142 of the body member thereof in the position shown best in FIGURES 2 and 3. A metal washer 140 is bonded to the top of each rubber ring 138 as shown in the figures. The annular rubber rings 138 are provided to act as spring members against which work pieces 20 placed on the expanding mandrels 24 may be positioned. The rubber rings serve to bias work pieces 20 in an upward direction against the locating bar 70 during the positioning of work pieces 20. The metal washers 140 provide a wear surface on the rubber ring 138 to increase the useful life thereof.

The cam release means 26 comprises a shaft 190 extending longitudinally of the horizontal frame member 28, mounting means 192 and 194 for the shaft 190 at each end of the work holding fixture of the invention, a bearing cap 196 surrounding the lower portion of the shaft 190 and secured to the horizontal frame member 28 by means of bolts 198 as shown in FIGURE 2, and a lever arm and handle 200 attached to the left end of shaft 190 as shown in FIGURE 1. The shaft 190 is provided with eccentric cylindrical portions 202 along the length thereof which register with the enlarged head 168 of the plunger member of individual expanding mandrels 24 spaced along the work holding device of the invention. The eccentric portions 202 of shaft 190 operate to release work pieces 20 from expanding mandrels 24 after grinding of the work pieces and to allow the positioning of the work pieces 20 on the expanding mandrels 24 before the grinding thereof.

In operation of the work holding fixture of the invention the locking clamps 22 are moved to their unlocked position by counter-clockwise rotation of handles 106, the locating apparatus is pivoted about pins 58 to the position wherein the neoprene bumpers 66 abut surfaces 68 of bracket hinges 52, and the shaft 190 is rotated by means of handle 200 so that eccentric surfaces 202 cause plungers 134 of expanding mandrels 24 to rise thereby allowing sleeve 132 to contract radially raising cones 130 by means of pressure applied to cam surfaces 150 and 152. Work pieces 20 in which it is desired to grind a half round groove 74 are sleeved over the expanding mandrel 24 as shown in FIGURE 2.

The locating apparatus is then again pivoted about pins 158 until the locating bar 70 abuts the surface of grooves 74 in the work pieces 20 with surfaces 88 and 90 thereof. Locking clamps 22 are then moved into the position shown in FIGURE 2 by a clockwise rotation of handle member 106. The stop 117 at the end of lever arm 102 of locking clamp 22 will at this time press firmly against portion 78 of the hinge arms 56 of the locating apparatus 18 causing the rest buttons 84 and 85 to firmly contact each other aligning the locating bar 70 and therefore the surfaces 88 and 90 thereof with the axis of rotation 21 of dresser spindle 14 as previously indicated whereby the work pieces 20 are positioned with respect to the dresser point 15 so that the grinding wheel 16 dressed by dresser point 15 will remove an equal amount of metal from each work piece 20 on passage thereover. The work piece 20 is forced tightly against the metal washer 140 and compresses the rubber ring 138 associated with the washer 140 on contact of the rest buttons 84 and 85. The work piece 20 is therefore biased upward against the surfaces 88 and 90 of the locating bar 70 by the rubber ring at this time.

With the work pieces 20 held in position over the expanding mandrels 24 by locating bar 70 in conjunction with locking clamps 22 and rubber springs 138 as just described the shaft 190 is rotated by means of handle 200 of cam release means 26 which due to the eccentric portions 202 of shaft 190 allows the plungers 134 of the expanding mandrels 24 to be lowered under pressure from springs 136. As the plungers 134 are lowered the enlarged heads 166 on the portions 170 thereof are caused to contact the upper end of cones 130 as shown in FIGURE 3. The downward movement of the enlarged heads 166 will therefore cause the cones 130 to move in a downward direction and the camming surfaces 156 and 158 on cone 130 will be caused to cam past the surfaces 150 and 152 on sleeves 132. The sleeves 132 under the radial forces developed on the camming surfaces 150 and 152 thereof will expand radially into contact with the inner surface of the work pieces 20 which are sleeved over the mandrels 24. The radial expansion of the sleeves 132 is facilitated by the longitudinally extending slots 164 in sleeves 132 as previously explained.

The locking clamps 22 may then be released by counterclockwise rotation of handle 106 as previously described. The locating apparatus 18 may be pivoted about pins 58 by gripping bar 82 and lifting upward so that the locating apparatus 18 is again in the position wherein the neoprene bumpers rest on surfaces 68 of the brackets 52. The work pieces 20 are at this time positioned so that the surfaces of grooves 74 thereof are all in the same position with respect to the axis of rotation 21 of dresser spindle 14 located radially inwardly from the position of the wheel dresser point 15 with respect to the axis 21. The grinding wheel 16 may then be dressed with dresser point 15 in the usual manner and passed over the surfaces of the grooves 74 to remove an equal amount of metal from each work piece 20 and to produce the half round groove in the work pieces 20 as illustrated in FIGURE 2.

On completion of the grinding of the desired groove in the work pieces 20 the shaft 190 of the cam release means 26 may be again rotated by means of handle 200 to cause the eccentric cam surfaces 202 to contact the enlarged heads 180 on the portions 168 of the plungers 134 causing the plungers 134 to raise as previously described. As before, the raising of plungers 134 will allow the expanded sleeves 132 to contract camming cones 130 upward into contact with the enlarged heads 166 of the mandrel plungers 134. The contraction of the expanded sleeves 132 will release the work pieces 20 allowing them to be removed and other work pieces 20 to be substituted therefor so that the operation just described may be repeated.

The particular embodiment of the work holding fixture of the invention which has just been described is especially suited to the positioning of work pieces 20 having a recess in the lower end thereof. However it will be understood that the principles of the invention may be applied equally as well to work pieces 20 having no recess in the lower end thereof. A particular modification of the work holding fixture of the invention which is adapted to position work pieces which cannot be sleeved over an expanding mandrel is illustrated in FIGURE 4. In the modification of FIGURE 4 it will be understood that the elements not illustrated such as the locking clamps 22, parts of the frame 10 and parts of the cam release mechanism 26 are similar to those just described. Members shown in FIGURE 4 which are similar to the members previously described in connection with the work holding fixture shown in FIGURES 1 to 3 will be given the same reference numerals followed by the suffix "a."

The modified work holding fixture of FIGURE 4 includes a frame member 204 which extends longitudinally of the work holding fixture for substantially the entire length thereof and which may be attached to the horizontal frame member 28a by convenient means such as welding. As indicated in FIGURE 4 vertical passages 206 are provided in frame member 204 spaced along the length thereof. The vertical passages 206 are provided with an enlarged diameter in the upper end thereof as shown at 208 to allow the insertion into the passage 206 of a wear sleeve 210 shaped as illustrated. The passage 206 is provided with an even larger diameter 212 at the extreme upper end thereof as shown to provide clearance for work pieces 20a which may be inserted within wear sleeve 210 for positioning by the work fixture as will subquently be described.

A hat shaped member 214 is provided at the lower end of passage 206 to receive the lower end of a work piece 20a inserted within wear sleeve 210. The hat member 214 is provided with a flange 216 around the lower edge thereof which contacts the lower end of the wear sleeve 210 to prevent the hat member 214 from being expelled from sleeve 210 due to the action of spring 218 acting between the inner surface 220 of the top of hat 214 and the upper surface of the horizontal frame member 28a.

Passages 222 are also provided in frame member 204 spaced along the length thereof so that they register with passages 208 as illustrated in FIGURE 4. The passages 222 contain shoe members 224 which are adapted to extend through openings 226 in wear sleeves 210 to frictionally engage work pieces 20a placed within wear sleeves 210. The shoe members 224 are biased toward the work pieces 20a by means of springs 228 located in passages 222 between the right end of shoe members 224 and a removable longitudinally extending frame member 230 which may be attached to frame member 204 by convenient means such as bolts (not shown).

A passage 232 extends longitudinally of frame member 204 as shown in FIGURE 4 to provide a housing for shaft 190a. Shaft 190a has eccentric cylindrical portions thereon similar to those of shaft 190 which register with shoe members 224 and which serve to allow springs 228 to press shoe members 224 firmly against properly positioned work pieces 20a in one position of shaft 190a and to remove the shoe members 224 from contact with the work pieces 20a in a second position of the shaft 190a.

The operation of the modification of the work holding fixture of FIGURE 4 is similar to that of the work holding fixture of FIGURES 1 through 3. Locking clamps 22a (not shown) are moved to their unlocking position, the hinge arm 56a of the locating apparatus 18a is caused to pivot about a pin 58a to allow the insertion of work pieces 20a within wear sleeves 210, while the shoe member 224 is positioned by shaft 190a to permit the insertion of the work pieces 20a in sleeves 210. The hinge arm 56a is then pivoted into the position shown in FIGURE 4 whereby locating bar 70a positions the work pieces 20a in opposition to resilient spring 218 acting on hat member 214 and the locking clamps 22a are placed in their locking position to insure the proper locating of locating bar 70a. The shaft 190a is then rotated whereby the eccentric portions thereof will allow the shoes 224 to press firmly against the sides of work pieces 20a under pressure from springs 228 thereby holding the work pieces 20a firmly in position for grinding. The locking clamps may then be unlocked and the hinge arm 56a may be pivoted about pin 58a to clear the top of work pieces 20a so that grinding of the desired grooves may be accomplished. At the completion of the grinding operation the shaft 190a may be again rotated to cause shoes 224 to assume the position indicated in FIGURE 4 whereby the work pieces 20a each having had a similar amount of metal removed therefrom may be removed from the work holding fixture shown in FIGURE 4.

Thus it can be seen that applicants have provided a work holding fixture whereby a plurality of work pieces may be simultaneously, quickly and correctly positioned so that an equal amount of metal may be removed from each work piece during a grooving or similar operation by relatively unskilled workmen. Furthermore as has been illustrated the invention applies equally well to work pieces which may be gripped internally by means of an expanding mandrel or which must be gripped externally by means of a wear sleeve and a cooperating spring pressed shoe member.

What we claim as our invention is:

1. A work holding fixture for simultaneously locating a plurality of workpieces so that an equal amount of material may be removed from a surface of each workpiece, comprising an elongated frame including a substantially flat support member, transversely extending vertical members spaced apart longitudinally of the support member and longitudinally extending frame members secured to each of the transverse members at each end thereof adjacent the top thereof, a separate vertically extending expanding mandrel secured to the support member between each pair of transverse members, a separate resilient annular pad sleeved over each of said expanding mandrels and resting on said support member for yieldably sustaining separate workpieces sleeved over the individual expanding mandrels, locating apparatus secured to said frame for simultaneously engaging each of said workpieces to accurately vertically position the workpieces on the resilient pads including a plurality of hinge arms pivotally secured to one side of said frame, a locating bar for simultaneously engaging each of said workpieces during limited pivotal movement of said hinge arms extending longitudinally of said frame and rigidly secured to each of said hinge arms whereby said hinge arms are constrained to move together and stops on the other side of said frame and on the other end of said hinge arms operable to limit pivotal movement of said hinge arms in one direction, clamps spaced longitudinally of said frame and supported by said frame and engageable with said other end of said hinge arms operable to hold said stops in contact with the hinge arms in a limiting position thereof and with said locating bar in engagement with the workpieces, and unitary cam means secured to the support member for simultaneously actuating said expanding mandrels.

2. A work holding fixture for simultaneously locating a plurality of work pieces so that an equal amount of material may be removed from a surface of each work piece, comprising separate means for simultaneously supporting the work pieces independently of each other in adjustable position to present a surface of each work piece from which material is to be removed, common locating means positioned adjacent each said separate supporting means, means supporting said common locating means for movement into simultaneous engagement with the surface of each of the work pieces from which material is to be removed for variably positioning the work pieces on said separate supporting means with the engaged surfaces in exact predetermined adjusted position, and separate means positioned adjacent each said separate supporting means for simultaneously clamping the work pieces on said supporting means in the variable positions thereof.

3. A work holding fixture for simultaneously locating a plurality of work pieces each having a surface from which work is to be removed so that an equal amount of material may be removed from said surface of each work piece, comprising separate means for simultaneously supporting the work pieces independently of each other in adjustable position to present said surface of each work piece from which material is to be removed, common means for locating each of the work pieces on said separate supporting means in variable adjusted position including a rigid elongated locator bar positioned adjacent each said separate supporting means, means supporting said locator bar for movement toward said separate supporting means into simultaneous engagement with the surface of each of the work pieces from which material is to be removed, and stationary stop means secured to said supporting means limiting movement of said locator bar toward said separate support means to variably determine the adjusted position of the work pieces with the engaged surfaces thereof in exact predetermined adjusted position, and separate means positioned adjacent each said separate supporting means for simultaneously clamping the work pieces on said supporting means in the variable positions thereof.

4. A work holding fixture for simultaneously locating a plurality of work pieces so than an equal amount of material may be removed from a surface of each work piece in a subsequent operation, comprising separate upright supports for simultaneously vertically adjustably supporting the respective work pieces independently of each other, a flat annular resilient pad on each of said separate supports for yieldably sustaining the work pieces, means for locating the work pieces on said separate supports in variable vertically adjusted position including a single rigid elongated locator bar movable downwardly toward said supports for simultaneous engagement with a surface of each of the work pieces from which material is to be removed pressing the work pieces downwardly on said resilient pads, and stop means secured to said supporting means limiting such downward movement of said locator bar to variably determine the adjusted position of the work pieces with the engaged surfaces in exact predetermined adjusted position, and separate means positioned adjacent each said separate supporting means for simultaneously clamping the work pieces on said separate supports in the variably adjusted position thereof.

5. A work holding fixture for simultaneously locating a plurality of work pieces each having a surface from which work is to be removed so that an equal amount of material may be removed from said surface of each work piece, comprising separate resilient means for simultaneously adjustably supporting the work pieces independently of each other, common rigid locating means positioned adjacent each said resilient supporting means movable toward said supporting means for simultaneously engaging said surface of each of the work pieces and variably locating the work pieces on said separate resilient supporting means with said surfaces in exact predetermined adjusted positions, and separate clamping means positioned adjacent each said separate supporting means for releasably securing the work pieces on said separate supporting means in the variable positions.

6. A work holding fixture for simultaneously locating a plurality of work pieces so that an equal amount of material may be removed from a surface of each work piece, comprising separate means for simultaneously adjustably supporting the work pieces independently of each other including resilient pads for yieldably sustaining the work pieces, common rigid locating means positioned adjacent each said separate supporting means simultaneously engageable with a surface of each of the work pieces from which material is to be removed for variably locating the work pieces on said separate supporting means with the surfaces in exact predetermined adjusted positions, and separate clamping means positioned adjacent each said separate supporting means for simultaneously clamping the work pieces on said supporting means in the variable positions.

7. A work holding fixture for simultaneously locating a plurality of work pieces so that an equal amount of material may be removed from a surface of each work piece, comprising separate means for simultaneously supporting the work pieces independently of each other in adjustable position to present said surface of each work piece from which material is to be removed, means for locating the work pieces on said supporting means in variable adjusted positions including a single elongated, rigid locator bar positioned adjacent each said separate supporting means, means supporting said locator bar for movement toward said separate supporting means into simultaneous engagement with said surface of each of the work pieces for moving the surfaces into exact predetermined positions, and separate clamping means positioned adjacent each said separate supporting means for simultaneously clamping the work pieces on said supporting means in said variable adjusted positions.

8. A work holding fixture for simultaneously locating a plurality of work pieces so that an equal amount of material may be removed from a surface of each work piece, comprising separate means for simultaneously supporting the work pieces independently of each other, common locating means positioned adjacent each said separate supporting means including a single rigid structure simultaneously engageable with a surface of each of the work pieces from which material is to be removed for variably locating the work pieces on said separate supporting means with the surfaces in exact predetermined adjusted position, and means for clamping the work pieces on said supporting means in the variable positions including an expanding mandrel positioned adjacent each said supporting means and operable on expansion to firmly grip said work pieces.

9. A work holding fixture for simultaneously locating a plurality of work pieces so that an equal amount of material may be removed from a surface of each work piece, comprising separate means for simultaneously adjustably supporting the work pieces independently of each other, common locating means positioned adjacent each said separate supporting means including a single rigid structure simultaneously engageable with said surface of each of the work pieces for variably locating the work pieces on said separate supporting means with said surfaces in exact adjusted position, and means for clamping the work pieces on said supporting means in the variable positions, including an expanding mandrel positioned adjacent each said supporting means and operable on expansion to firmly grip said work pieces, and single cam means operable to produce simultaneous expansion and simultaneous contraction of all said expanding mandrels as desired.

10. A work holding fixture for simultaneously locating a plurality of work pieces so that an equal amount of material may be removed from a surface of each work piece, comprising separate means for simultaneously adjustably supporting the work pieces independently of each other, common locating means positioned adjacent each said separate supporting means including a single rigid structure simultaneously engageable with the surfaces of each of the work pieces from which material is to be removed for variably locating the work pieces on said separate supporting means with the surfaces in exact adjusted position, and means for clamping the work pieces on said supporting means in the variable positions, including separate cam operable friction shoes positioned adjacent each said supporting means for simultaneously engaging all said work pieces.

11. A work holding fixture for simultaneously locating a plurality of work pieces so that an equal amount of material may be removed from a surface of each work piece, comprising an elongated frame, resilient pads spaced longitudinally of said frame for supporting said plurality of work pieces, locating apparatus extending longitudinally of said frame including a plurality of hinge arms, one end of each of said hinge arms being pivotally secured to one side of said frame, said locating apparatus further including stops on said frame and stops on the other end of said hinge arms operable to limit pivotal movement of said hinge arms in one direction, a single locating bar for simultaneously engaging the surface from which the material is to be removed of each of said work pieces during limited pivotal movement of said hinge arms to variably locate the work pieces on said resilient pads with respect to said frame with the surfaces in exact predetermined positions, said locating bar extending longitudinally of said frame and being rigidly secured to each of said hinge arms whereby said hinge arms are constrained to move together, and individual means for simultaneously securing each work piece on said supporting means in the variable positions.

12. A work holding fixture as set forth in claim 11 and including locking clamps spaced longitudinally of said frame and supported by said frame and engageable with said other end of said hinge arms operable to hold said stops in contact with the hinge arms in a limiting position thereof and said locating bar in engagement with the work pieces while the work pieces are secured in the variable positions thereof to insure accurate location thereof.

13. A work holding fixture as set forth in claim 11 wherein the individual means for securing each work piece on said supporting means are cam operable and including a single longitudinally extending cam supported by said frame for simultaneously operating all of said individual means.

14. A work holding fixture for simultaneously locating a plurality of work pieces so that an equal amount of material may be removed from a surface of each work piece, comprising an elongated frame including a substantially flat support member, transversely extending vertical members spaced apart longitudinally of the support member and longitudinally extending frame members secured to each of the transverse members at each end thereof adjacent the top thereof, a separate vertically extending expanding mandrel secured to the support member between each pair of transverse members, a separate resilient annular pad sleeved over each of said expanding mandrels and resting on said support member for yieldably sustaining separate work pieces sleeved over the individual expanding mandrels, locating apparatus secured to said frame for simultaneously engaging each of said work pieces to accurately vertically position the work pieces on the resilient pads including a plurality of hinge arms pivotally secured to one side of said frame, a locating bar for simultaneously engaging each of said work pieces during limited pivotal movement of said hinge arms extending longitudinally of said frame and rigidly secured to each of said hinge arms whereby said hinge arms are constrained to move together and stops on the other side of said frame and on the other end of said hinge arms operable to limit pivotal movement of said hinge arms in one direction, clamps spaced longitudinally of said frame and supported by said frame and engageable with said other end of said hinge arms operable to hold said stops in contact with the hinge arms in a limiting position thereof and with said locating bar in engagement with the work pieces, and means secured to the support member for actuating said expanding mandrels.

15. A work holding fixture for simultaneously locating a plurality of work pieces so that an equal amount of material may be removed from a surface of each work piece, comprising an elongated frame, vertically extending expanding mandrels secured to the frame in longitudinally spaced relation, a separate resilient annular pad sleeved over each of said expanding mandrels and resting on said support member for yieldably sustaining separate work pieces sleeved over the individual expanding mandrels, locating apparatus secured to said frame for simultaneously engaging each of said work pieces to accurately vertically position the work pieces on the resilient pads including a plurality of hinge arms pivotally secured to one side of said frame, a locating bar for simultaneously engaging each of said work pieces during limited pivotal movement of said hinge arms extending longitudinally of said frame and rigidly secured to each of said hinge arms whereby said hinge arms are constrained to move together and stops on the other side of said frame and on the other end of said hinge arms operable to limit pivotal movement of said hinge arms in one direction, clamps spaced longitudinally of said frame and supported by said frame and engageable with said other end of said hinge arms operable to hold said stops in contact with the hinge arms in a limiting position thereof and with said locating bar in engagement with the work pieces, and means secured to the support member for actuating said expanding mandrels.

16. A work holding fixture for simultaneously locating a plurality of work pieces so that an equal amount of material may be removed from a surface of each work piece, comprising an elongated frame, vertically extending expanding mandrels secured to the frame in longitudinally spaced relation, a separate resilient annular pad sleeved over each of said expanding mandrels and resting on said support member for yieldably sustaining separate work pieces sleeved over the individual expanding mandrels, locating apparatus secured to said frame for simultaneously engaging each of said work pieces to accurately vertically position the work pieces on the resilient pads including a hinged locating bar for simultaneously engaging each of said work pieces extending longitudinally of said frame, stops on said frame for limiting movement of the locating bar in one direction, clamps spaced longitudinally of said frame and supported by said frame and engageable with said locating apparatus operable to hold said stops in contact with the locating apparatus in a limiting position thereof and with said locating apparatus in engagement with the work pieces, and means secured to the support for actuating said expanding mandrels.

References Cited in the file of this patent

UNITED STATES PATENTS

| | | |
|---|---|---|
| 1,077,380 | Wellman | Nov. 4, 1913 |
| 1,696,027 | Bullard | Dec. 18, 1928 |
| 2,055,199 | Hofmann | Sept. 22, 1936 |
| 2,654,413 | Weidel | Oct. 6, 1953 |